June 23, 1959  C. H. INESON  2,891,503
MACHINE FOR LOOSENING ENAMELLED ARTICLES FROM SCREENS
Filed June 6, 1958  7 Sheets-Sheet 1

INVENTOR
Clifton H. Ineson
BY
Wooster & Davis
ATTORNEYS.

June 23, 1959 C. H. INESON 2,891,503
MACHINE FOR LOOSENING ENAMELLED ARTICLES FROM SCREENS
Filed June 6, 1958 7 Sheets-Sheet 2
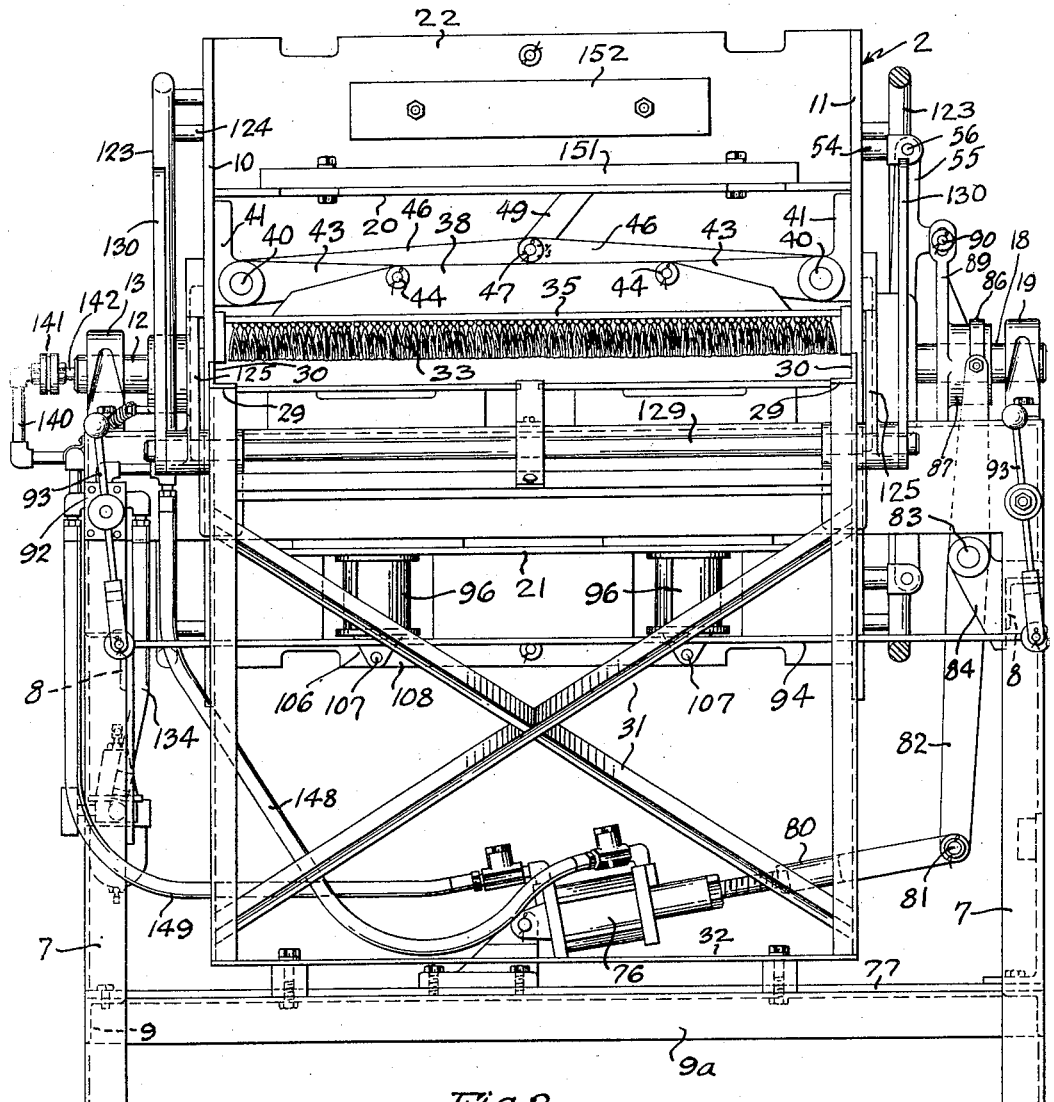
Fig.2.
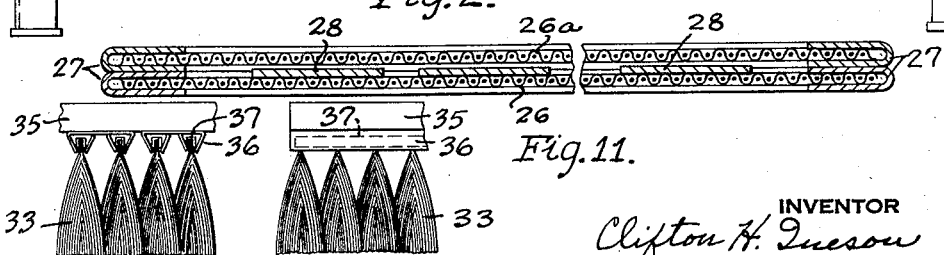
Fig.11.
Fig.12.    Fig.13.
INVENTOR
Clifton H. Ineson
BY
Wooster & Davis
ATTORNEYS.

June 23, 1959
C. H. INESON
2,891,503
MACHINE FOR LOOSENING ENAMELLED ARTICLES FROM SCREENS
Filed June 6, 1958
7 Sheets-Sheet 3
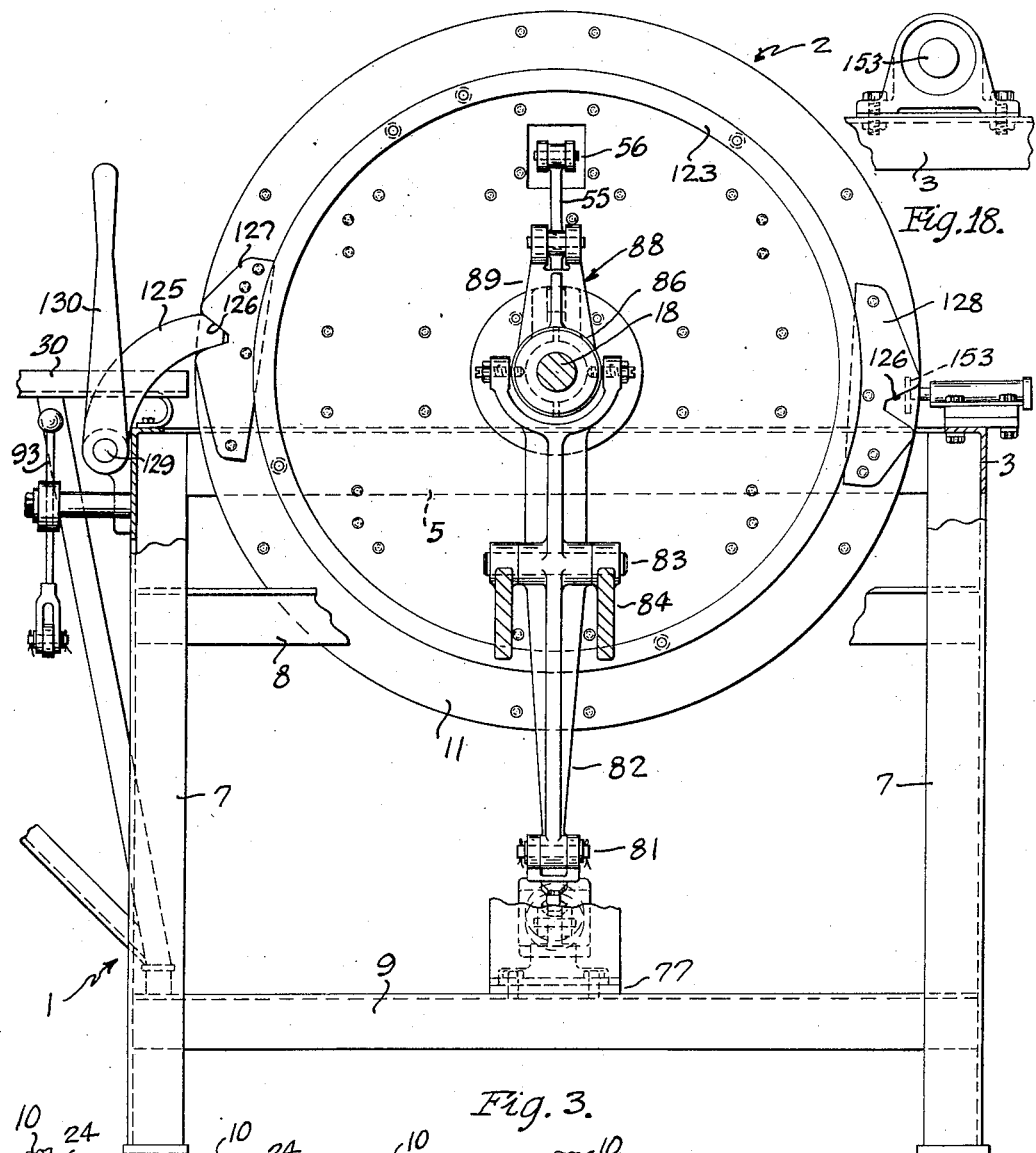
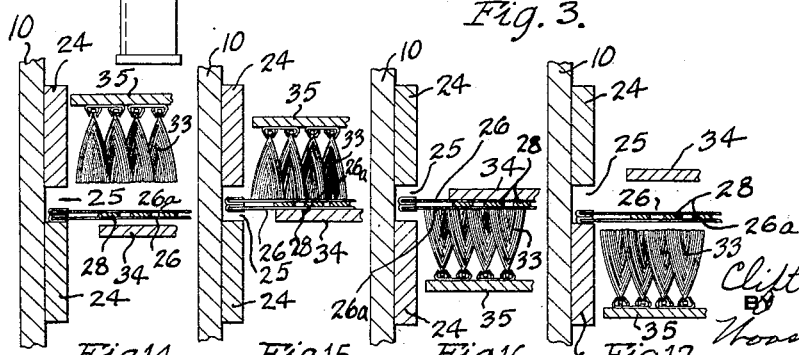
INVENTOR
Clifton H. Ineson
BY
Wooster & Davis
ATTORNEYS.

June 23, 1959

C. H. INESON 2,891,503

MACHINE FOR LOOSENING ENAMELLED ARTICLES FROM SCREENS

Filed June 6, 1958

INVENTOR
Clifton H. Ineson
BY
Wooster & Davis
ATTORNEYS.

June 23, 1959 C. H. INESON 2,891,503
MACHINE FOR LOOSENING ENAMELLED ARTICLES FROM SCREENS
Filed June 6, 1958 7 Sheets-Sheet 5

INVENTOR
Clifton H. Ineson
BY
Munster & Davis
ATTORNEYS.

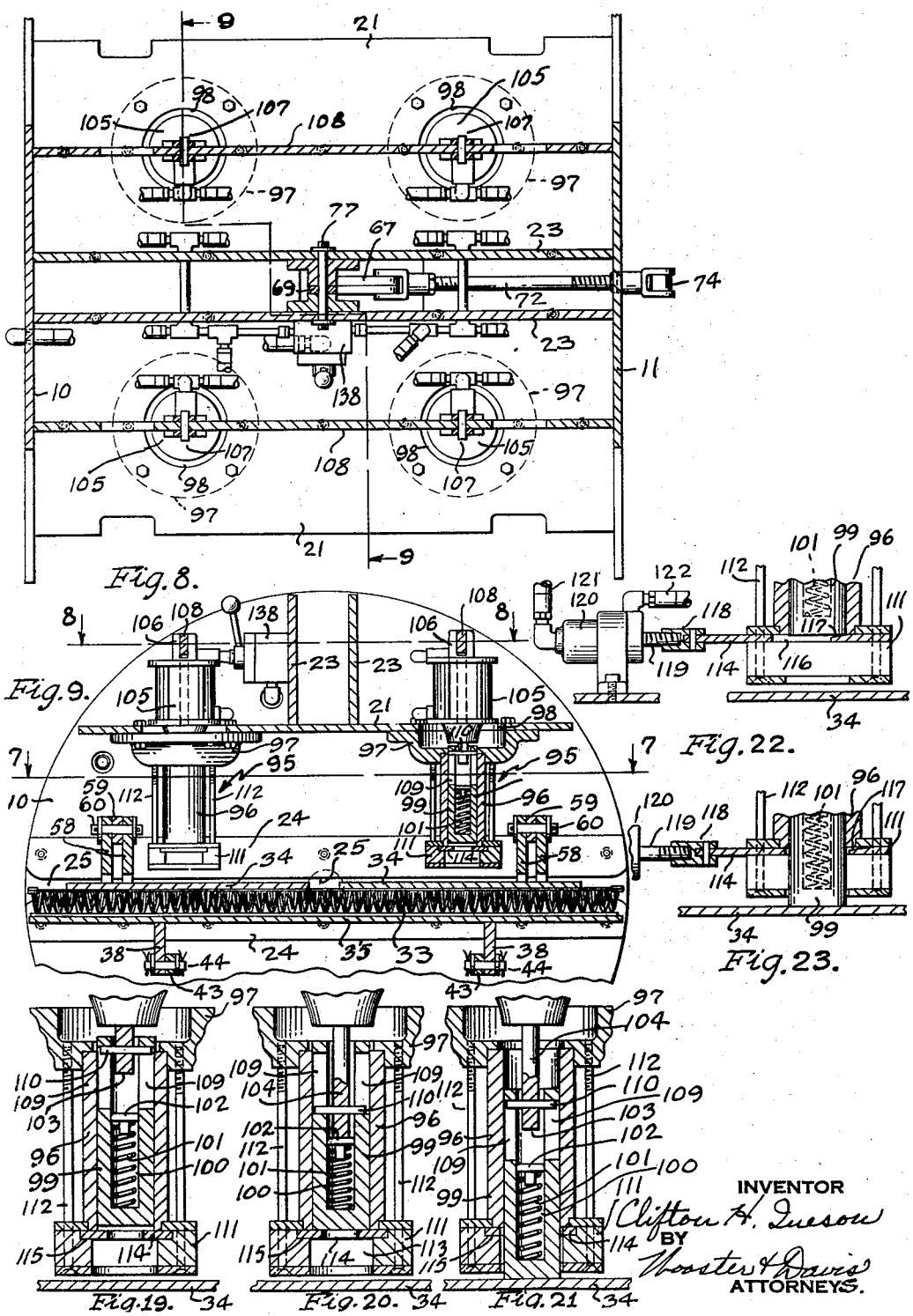

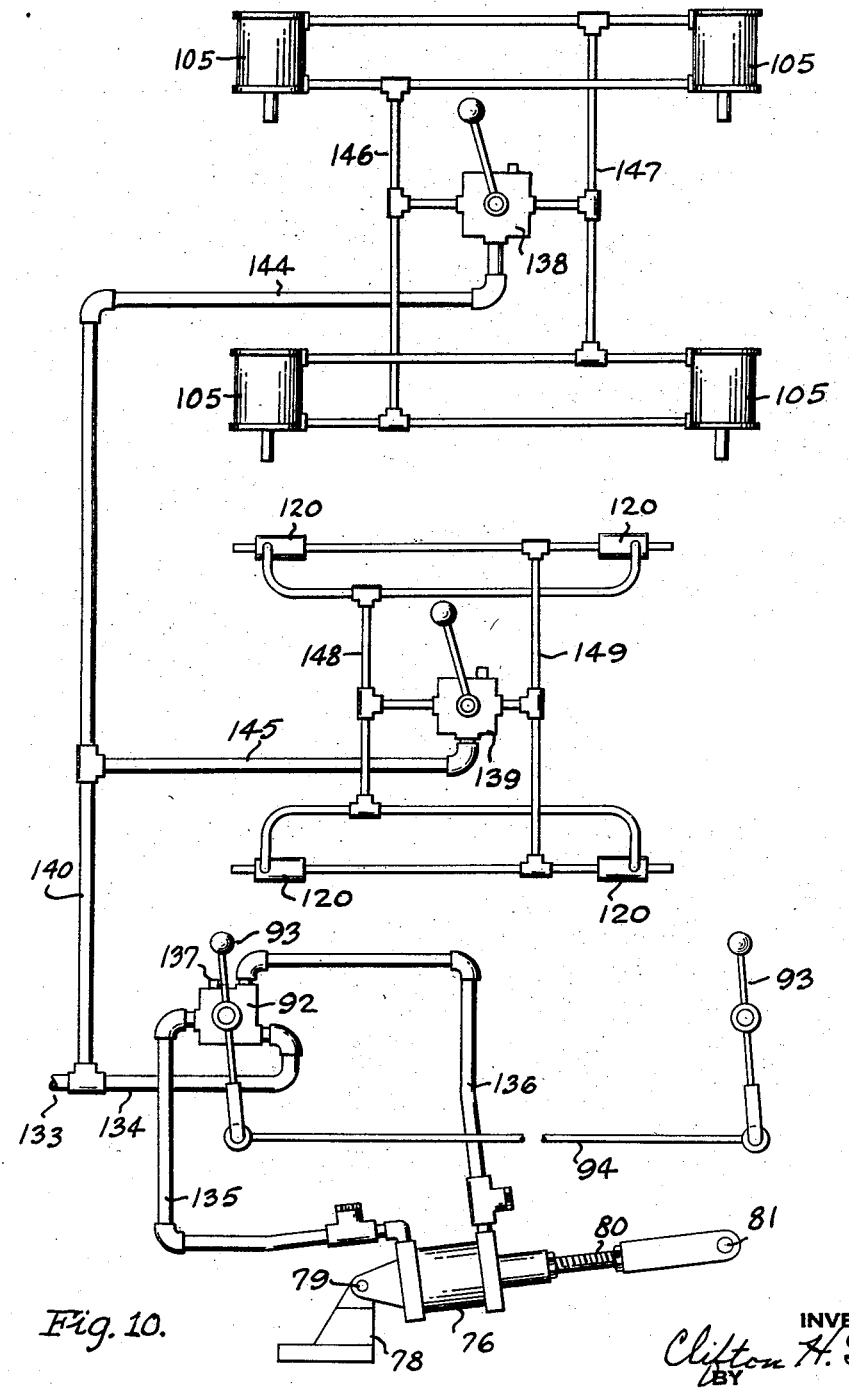

United States Patent Office 2,891,503
Patented June 23, 1959

2,891,503
MACHINE FOR LOOSENING ENAMELLED ARTICLES FROM SCREENS

Clifton H. Ineson, Oakville, Conn., assignor to The Waterbury Plating Company, New Haven, Conn., a corporation of Connecticut Application June 6, 1958, Serial No. 740,433

10 Claims. (Cl. 118—57)

This invention relates to a machine for loosening enamelled articles from a supporting screen. When a series of small articles such, for example, as the slides commonly used on ladies' hose supporters fastened to garments such as girdles or the like, are enamelled, it is common practice to place them on woven wire screens and spray them with enamel and then bake them. In the spraying operation the over-spray will cause the slides to stick to the screen and they have to be loosened before they can be turned for spraying the opposite side, as well as to remove them from the screen after the enamelling operation. For this purpose a second screen is superimposed over the slides on the first screen, and these screens are clamped between a bristle brush and a clamping plate and then a heavy blow is imparted to the plate manually by a heavy metal instrument. This operation requires a relatively heavy blow and is very tiring to the operator, as well as being time-consuming.

It is an object of the present invention to overcome these objections and provide a machine whereby the superimposed screens, with the slides between them adhering or stuck to one of the screens, may be slid into position in the machine between the bristle brush and clamping plates, this brush and the plates being then clamped on opposite sides of the screen and the required heavy blow applied to one of these clamping members, preferably the plates, by a mechanical means, preferably a compressed air-operated mechanism, to effect the loosening of the slides on the screen, after which the superimposed screens with the loosened slides may be removed from the machine, and the opposite sides of the slides enamelled, and again loosened or separated from the screen in the machine in the same manner.

It is also an object to provide such a machine which is easy to operate and which eliminates the manual blow required in the old operation.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

In these drawings:

Fig. 2 is a front view with the parts shown in the loading position for the superimposed screens carrying the articles to be loosened;

Fig. 3 is an end view looking from the right of Fig. 2 with parts broken away;

Fig. 8 is a section substantially on line 8—8 of Fig. 9;

Fig. 9 is a section substantially on line 9—9 of Fig. 8 showing the parts in reversed position from that of Figs. 2, 4 and 5;

Fig. 10 is a diagrammatical view of the piping connections and valves for controlling the air-operated cylinders;

Fig. 11 is a transverse section of a pair of superimposed screens with the articles to be loosened shown between them and on the surface of the lower screen;

Fig. 12 is an edge view of a portion of the brush;

Fig. 13 is a side view thereof;

Fig. 14 is a detail section showing one edge portion of the superimposed screens between the brush and the clamping plate immediately after loading them in their position in the machine;

Fig. 15 is a similar section showing the screens clamped between the brush and the clamping plates;

Fig. 16 is a similar section showing them in the reversed position;

Fig. 17 is a similar section showing the screens released after the blow for the loosening operation;

Fig. 18 is a front view of a stop means for the screens;

Fig. 19 is a section of the blow-imparting means in its normally retracted position;

Fig. 20 is a similar view showing it in the loaded position;

Fig. 21 is a similar section showing it released to impart a blow to the clamped screens;

Fig. 22 is a detail section of the trigger release for the blow imparting means showing it in the holding position, and Fig. 23 is a similar section showing this trigger release in the released position.

Figure 1:
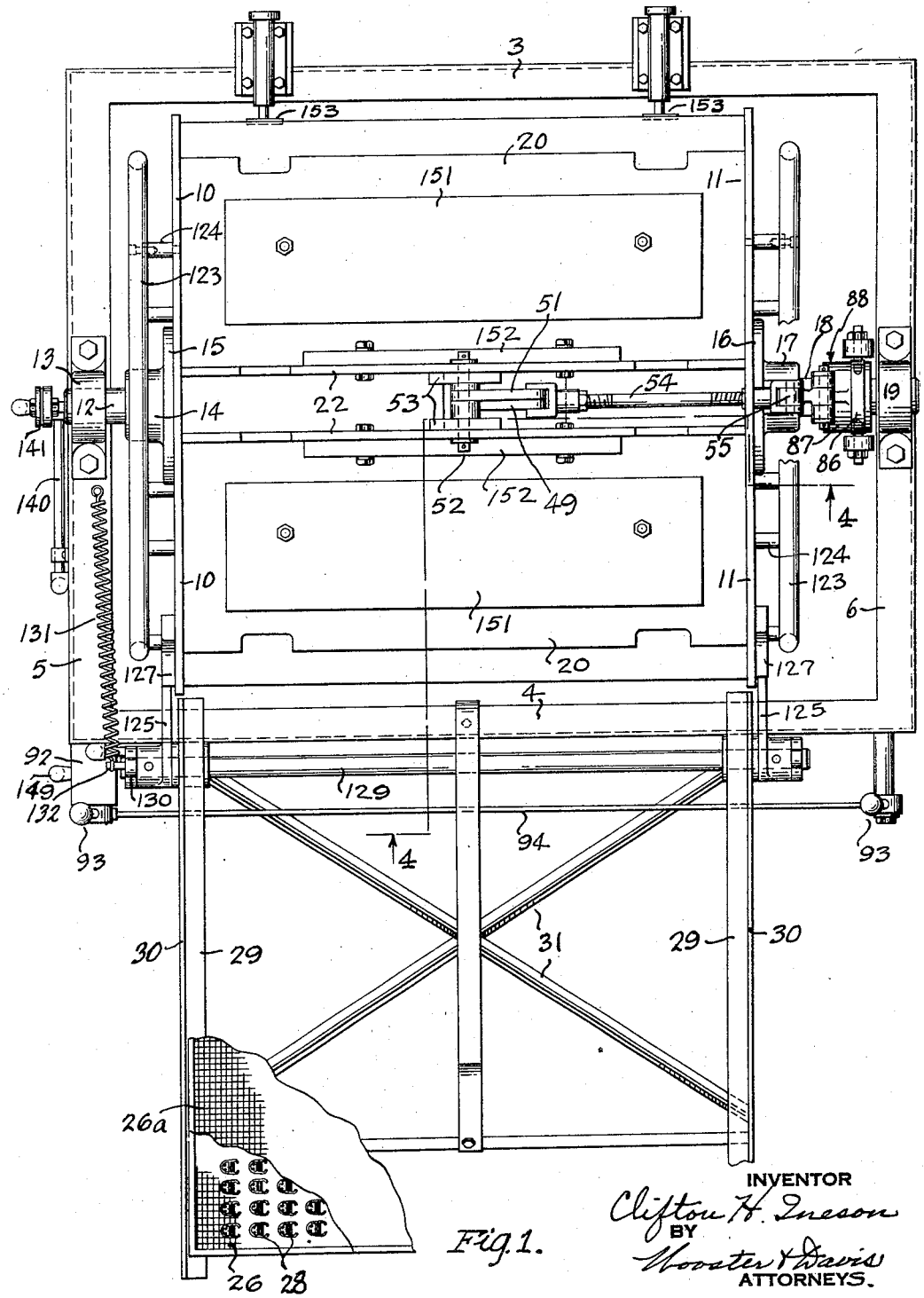
Fig. 1 is a top plan view of the machine with parts broken away, showing the parts in the loading position.

The machine in the form shown comprises a supporting frame 1, and mounted in this frame is a rotatable turret or drum 2. The frame may be of any suitable construction, but that shown comprises upper horizontally arranged angle members 3, 4, 5 and 6 secured together at their adjoining ends by any suitable means, such, for example, as welding, providing an upper open top frame structure on which the turret or drum is mounted, and this structure is mounted on suitable upright supporting legs 7 also of angle members, and these may be braced by suitable cross members 8 and 9, and longitudinal members 9a. The rotatable turret or drum comprises a supporting structure for retaining the superimposed screens on one of which the slides or articles to be loosened are attached, and the means for clamping these screens and imparting the required blow for loosening the enamelled articles and separating them from the screens. This turret or drum comprises a pair of longitudinally spaced upright end members 10 and 11 comprising circular flat discs each mounted on a short shaft mounted in bearings supported on the end members 5 and 6 of the frame structure. The disc 10 is supported on a short hollow shaft 12 in a suitable bearing 13 mounted on top of the member 5, and it is secured at its inner end to a flanged hub 14, the flange 15 of which is secured to the outer side of the end member 10. The member 11 is secured to the flange 16 of a similar hub 17 on the inner end of the short shaft 18 running in the bearing 19 mounted on the top of the frame member 6. Therefore with this mounting structure the turret or drum comprising the end members 10 and 11, together with the other structures carried thereby, are rotatable about a horizontal axis in the frame structure.

Secured at their opposite ends to the plates 10 and 11 and extending longitudinally between them are a number of supporting plates. These comprise a pair of laterally spaced plates 20 and 21 spaced laterally of the longitudinal axis of the drum and located in planes forming cords of the circular end members, as indicated more clearly in Fig. 5. Extending outwardly from the plate 20 is a pair of laterally spaced plates 22 at right angles to the plate 20, and similar longitudinal plates 23 extend outwardly from the plate 21 at right angles thereto. Mounted on the inner sides of the end members 10 and 11 are laterally spaced strips 24 forming guide grooves 25 to receive the opposite edges of the superimposed trays carrying the articles to be loosened from a tray. These trays in the form commonly used, as shown in Figs. 1 and 2, comprise woven wire screens 26 and 26a bound at their peripheral edges with a U-shaped metal strip 27. The screens commonly used are about 27" square, with about 1/8" mesh of approximately 3/64" wire, and they are slid into this turret or drum, for the operation of loosening the articles or slides 28 from the surface of one of the screens, by sliding their opposite edges into the guide channels 25 from the front of the machine to the position indicated in Fig. 4, as will later be described. They are slid into this position from the front of the machine on suitable laterally spaced guides 29, which may be angle members arranged with vertical and horizontal flanges, as shown in Figs. 1 and 2, the horizontal flanges providing a supporting guide for the edges of the screens, while the vertical flanges 30 form guides for the opposite edges of the screen to direct them to the guide channels 25. These guides 29 are supported on any suitable frame work 31 and 32 secured to the front member 4 of the main frame structure and the lower longitudinal bracing member 9a, as indicated in Fig. 2.

Figure 4:
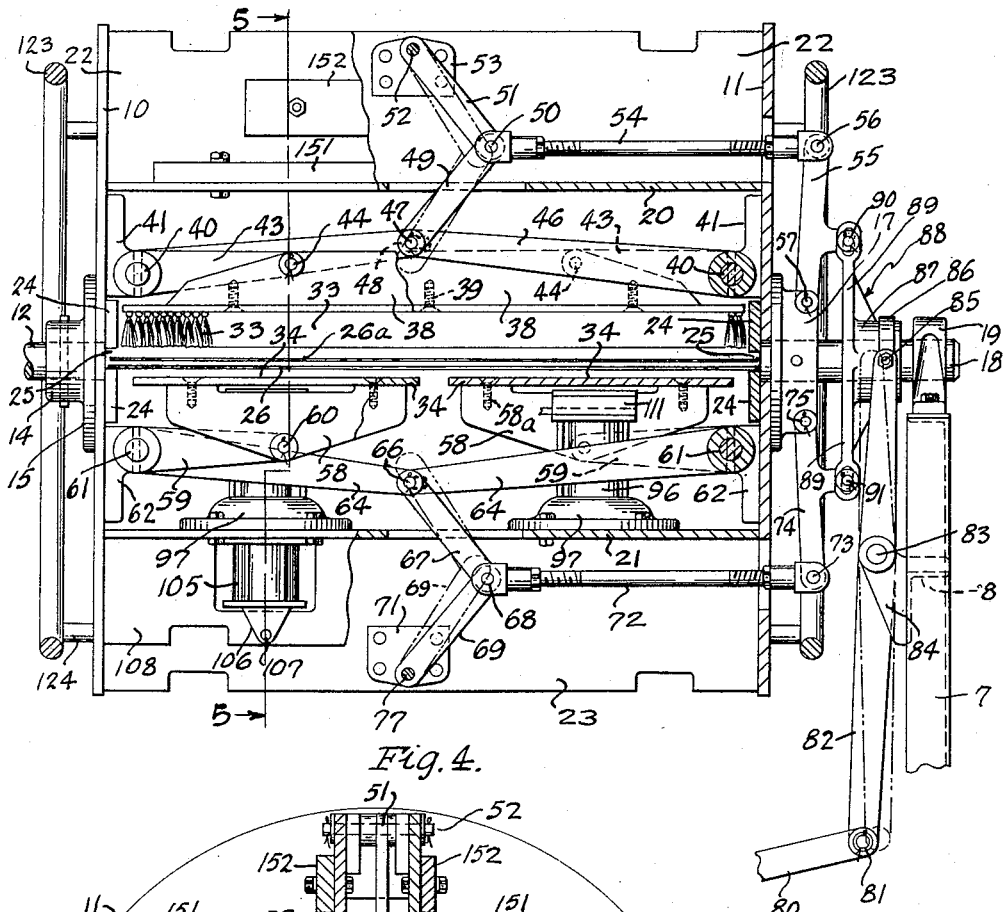
Fig. 4 is a vertical section substantially on line 4—4 of Fig. 1.
Figure 5:
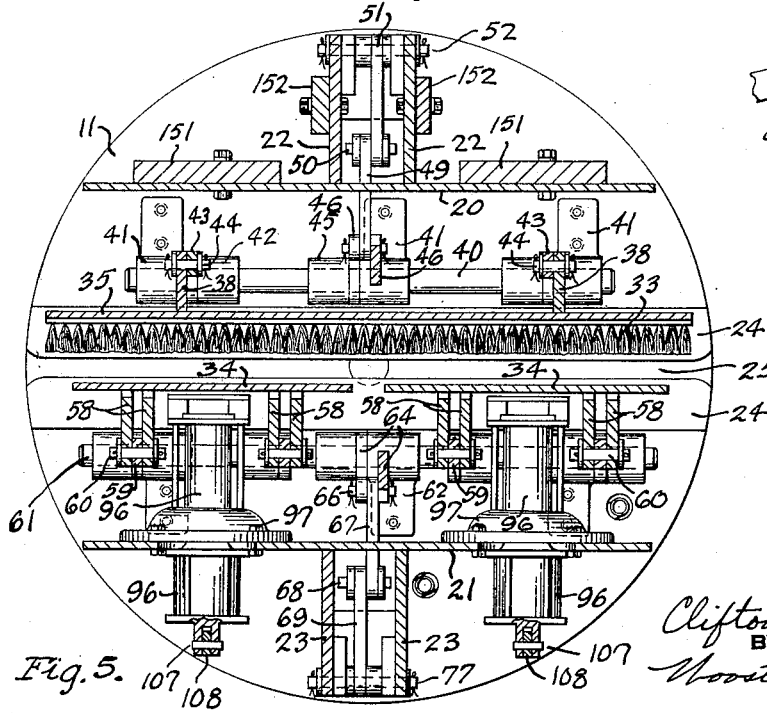
Fig. 5 is a transverse section substantially on line 5—5 of Fig. 4, with the parts in the loading position.
Figure 6:
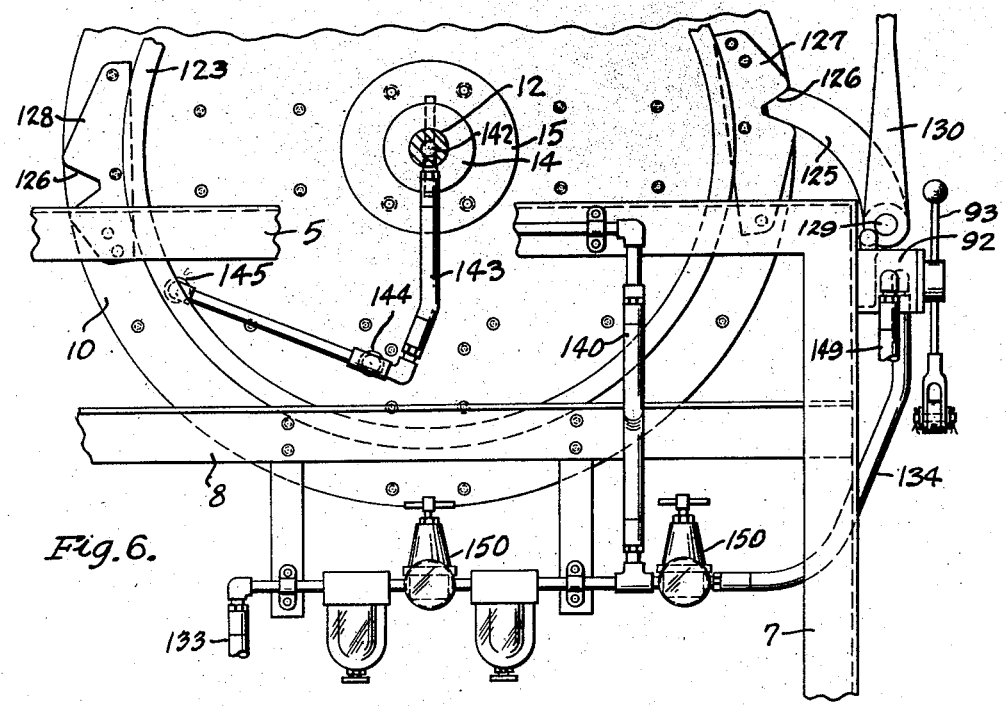
Fig. 6 is a partial end view looking from the left of Fig. 2 with parts broken away.

Mounted in the rotatable turret or drum on opposite sides of the guide channels 25, and therefore on opposite sides of the pair of screens inserted in these guides, is a bristle brush 33 and a number of clamping plates 34. The brush 33 is of a size to cover the screens and therefore extends substantially the entire distance between the end members 10 and 11, as shown in Figs. 2 and 4, and is also of a width to extend substantially the full diameter of these members, as shown in Figs. 5 and 9. This brush may be of any suitable construction, but in the form shown comprises a board 35 forming a backing and support for the bristles which may be in clumps mounted in a series of sheet metal channels 36 secured on the under side of the board 35 and extending for the full width thereof, the sides of the channels being downwardly and inwardly inclined or tapered, as shown in Fig. 12, to retain the clumps of bristles mounted in any suitable clips 37 slidable into these channels from the ends thereof, thus permitting renewal of the bristles when desired. This brush is mounted by securing it to the lower edges of longitudinally extending flat bars or clamps 38 by any suitable means such as screws 39 (Fig. 4), there being two of these clamps spaced laterally, as shown in Figs. 5 and 9.

Means is provided for shifting this brush toward and from the screens in the guides 25 for the clamping and releasing operation. For this purpose there are mounted on the inner sides of the end members 10 and 11 a pair of transverse shafts 40 in suitable bearing brackets 41 secured to the inner sides of the discs 10 and 11. Secured to each shaft by suitable hubs 42 are supporting arms 43 extending longitudinally inward from the end members 10 and 11 and pivoted at their free ends as indicated at 44 to the clamping bars 38, these arms being of a length so that the pivotal connections 44 are longitudinally spaced on the bars 38, as shown in Figs. 2 and 4. Also secured to each of the shafts 40 by suitable hubs 45 and located between the arms 43 are longer arms 46 pivoted together at their free ends by a pivot pin 47 running in an elongated slot 48 in one of these arms 46. This pin also forms a pivotal connection for a toggle link 49 to these arms 46, the other end of the link 49 being pivoted at 50 to one end of a similar toggle link 51 pivotally connected at 52 at its opposite end to brackets 53 mounted on the inner sides of the supporting plates 22. The pivotal connection 50 between the links of the toggle is connected by a rod 54 to an operating lever 55 at 56, this lever being secured and pivoted at its inner end to the hub 17 as shown at 57 (Fig. 4).

Figure 7:
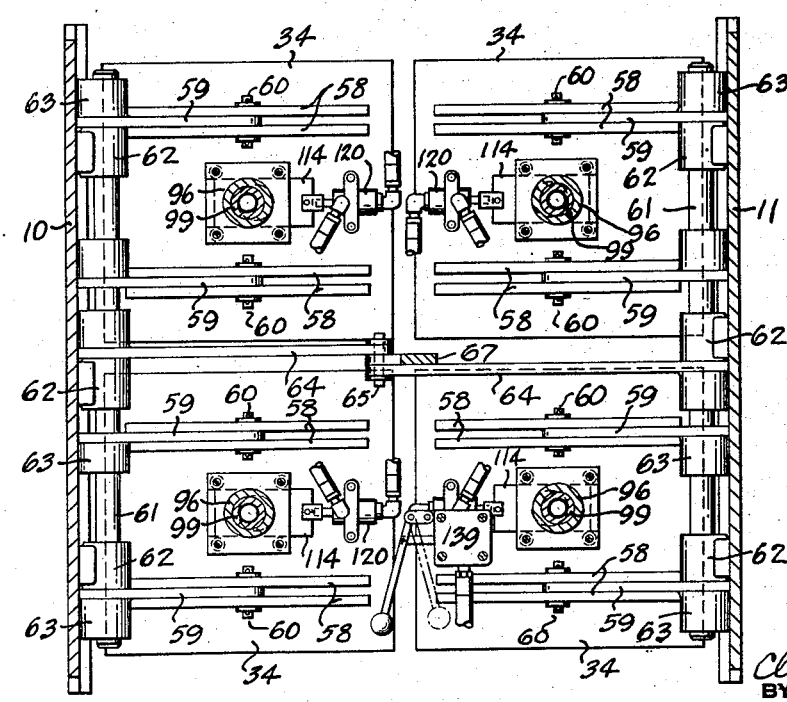
Fig. 7 is a detail section substantially on line 7—7 of Fig. 9.

The clamping plates 34, of which there are four in the present construction, are mounted on the opposite side of the guide channels 25 from the brush 33 and are therefore on the opposite side of the screens 26 and 26a from the brush when these screens are located in these guides. Each of these plates is mounted on two pairs of supporting and clamping brackets 58 to which the plates are secured by any suitable means, such, for example, as screws 58a (Fig. 5) or by welding, and, as shown in Fig. 7, these brackets are arranged in pairs with the members of each pair on opposite sides of a lever arm 59 to which they are pivotally connected by a transverse pivot pin 60. At their opposite ends these arms are secured to transverse shafts 61 mounted in any suitable bearing brackets 62 secured on the inner sides of the end supports or discs 10 and 11. The arms 59 include suitable hubs 63 by which they may be pinned or otherwise secured to the shaft. There are thus two pairs of clamps 58 and a pair of arms 59 secured to each clamping plate 34. Also secured to each shaft 61 at substantially the mid length thereof is a longer lever arm 64 pivotally connected at their free ends by a transverse pivot pin 65 running in an elongated slot 66 in one of the arms 64. This pin also forms a pivotal connection for a toggle link 67 the other end of which is connected at 68 to another toggle link 69 pivotally connected at its opposite end by a transverse pin 70 to brackets 71 mounted on the inside of the supporting plates 23. The pivotal connection 69 to the toggle links also connects these links to an operating rod 72 pivoted at its opposite end 73 to a lever 74 pivotally connected at 75 to the hub 17.

Compressed air-operated means for operating the brush 33 and the clamping plates 34, to shift them toward and from the screens inserted between them for the clamping and releasing operations, comprises a cylinder 76 (Figs. 2 and 10) mounted on a longitudinally extending supporting plate 77 extending between the cross members 9 of the frame, by means of a suitable bracket 78 to which it is pivotally connected at 79. Extending from a piston in this cylinder is an adjustable connecting rod 80, pivotally connected at 81 to the lower end of an upright lever 82, pivotally mounted at 83 on a bracket 84 mounted on the transverse member 8, and pivotally connected at its other end 85 to a collar 86 mounted in a peripheral groove in the hub 87 on a spider 88 slidable longitudinally on the shaft 18, and provided with oppositely extending arms 89 pivotally connected at 90 and 91 respectively to the levers 55 and 74. Thus operation of the connecting rod 80 by the cylinder will shift the spider 88 and through the levers 55 and 74 and connecting rods 54 and 72 will operate the toggles 49, 51 and 67, 69 to operate the brush 33 and the clamping plates 34 to clamp these members on opposite sides of the screens 26 and 26a when in position between them, or to shift these members to their released positions. Compressed air is supplied to the opposite ends of the piston in the cylinder 76 for this operation by means of a control valve 92 mounted at one end of the frame near the front thereof and controlled by suitable hand-operated levers 93. There is preferably one of these levers at each end of the machine connected by a connecting rod 94 so that the valve may be operated by an operator at either end of the machine.

Means is provided for imparting to the screens, when they are clamped between the brush and the plates 34, a jarring blow which acts to loosen the articles, such as the slides 28, which may be stuck to the surface of one of the screens. This machine is constructed to impart this jarring blow to the plates 34 which are normally clamped against the outer side of the screen to which the slides or similar articles are attached by the enamel. This blow is imparted to each individual plate 34 by a compressed air- and spring-operated hammer, indicated as a whole at 95. Each of these hammer devices comprises a guide cylinder 96 mounted at one end in a support 97 secured to the inner side of the plate 21, about an opening 98 in this plate. In this cylinder 96 is a reciprocable plunger 99 forming a hammer for delivering the blow to the plate 34, there being one for each plate, located on the opposite side of this plate from the brush 33, as indicated in Figs. 4, 5 and 9. Each hammer or plunger 99 is provided with a longitudinal socket 100 extending from its inner or upper end, as shown in Figs. 19 to 21, in which is a compression spring 101 seating at its lower end on the bottom of this socket, and at its upper end against a disc 102, which is in alignment with the free end 103 of a piston rod 104 connected to a piston (not shown) in an air cylinder 105 mounted on the opposite side of the plate 21 by a suitable forked connection 106 pivoted at 107 to a longitudinally extending plate 108. There are two of these plates 108 extending between the end members 10 and 11 to which they are secured, as well as the outer side of the plate 21. The plunger or hammer 99 is provided in its opposite sides above the spring with a pair of longitudinal slots 109 in which slide the opposite ends of a transverse pin 110 carried by the piston rod 104. At the lower end of the cylinder 96 is a head or block 111 connected to the support 97 by suitable tie rods 112, and this head or block is provided with an opening 113 through it for movement of the free end of the hammer or plunger 99, and at the upper end of this opening under the plunger 49 when in its upper or retracted position, is a trigger plate 114 mounted to slide in suitable guideways 115 in the head or block 111. This trigger slide or plate has an opening 116 through which the plunger 99 may project when released, and at one side of which opening is an inclined surface 117 which may be shifted under the plunger, as shown in Fig. 22. In this position it retains the plunger in its retracted position during the loading of the spring 101, and preparing the plunger for the hammer blow. This trigger plate is connected by a suitable coupling 118 to the piston rod 119 of a suitable piston (not shown) in an air cylinder 120. Air supplied to the left end of this cylinder through pipe 121 will shift the trigger plate 114 to the right as viewed in Fig. 22 to shift the inclined surface 117 from under the plunger to release it to permit it to impart a blow to the plate 34 under action of the loaded spring, as will presently be described. Air supplied to the opposite end of the cylinder 120 through a pipe 122 will shift this trigger to the holding position of Fig. 22 after the plunger 99 has been retracted, the air in the left hand end being exhausted through the control valve 139.

As previously described, the turret or drum 2 is mounted to rotate about a horizontal axis. This permits it to be turned to two different positions, the first position of Figs. 1, 4 and 5, for insertion of the superimposed screens 26 between the brush 33 and the clamping plates 34, and a position turned at 180° from this position to the position of Fig. 9 for imparting the article-loosening blow to the clamping plates 34. To facilitate this operation a circular hand rail 123 is secured to the outer side of each of the end members 10 and 11 and spaced a short distance therefrom by suitable securing means 124, these hand rails permitting the operator to readily turn the turret to either position desired. Means is provided to retain it in these positions, comprising the pivoted pawls 125, one at each end of the turret adapted at its free end to seat in holding recesses 126 in the locking plates 127 and 128 mounted on diametrically opposite sides of the end members 10 and 11 at the outer sides thereof. Pawls 125 are mounted on a suitable transverse shaft 129 mounted in suitable bearings in the frame with a hand lever 130 secured to the shaft at each end for releasing the pawls 125 to permit turning of the turret, a coiled spring 131 being provided tensioned to tend to shift the pawls to the holding position, this spring being connected at one end 132 to one of the levers 130 and at its other end to the frame.

Means is provided for supplying compressed air to the various cylinders 76, 105 and 120 for operating the various devices connected to the pistons in these cylinders. Thus there is a supply pipe 133 from any suitable source of supply of compressed air, leading by means of the pipe 134 to the hand valve 92 and controlled by this valve to supply compressed air through the connections 135 and 136 to opposite ends of the cylinder 76 for operating the devices connected to the connecting rod 80, the air being exhausted from one end of the cylinder through the valve and exit 137 while being supplied to the other end. Similarly, supply pipes are provided for operation of the pistons in the cylinders 105 and 120, the cylinders 105 being controlled by the hand valve 138 and the cylinders 120 by the hand valve 139. The pipe connection 140 is led from the supply to these valves, it being connected by a coupling 141 (Fig. 2) to the pipe 142 leading through the hollow shaft 12 to carry it through the bearing 13, and by means of branch 143 to connections 144 and 145 connected to the valves 138 and 139 respectively. Coupling 141 comprises pivotally connected sections the inner of which turns with the shaft so the pipe connections carried by the drum may rotate with it. From 138 connections 146 and 147 lead to their respective cylinders 105 at the opposite ends thereof, and similar connections 148 and 149 lead from the valve 139 to opposite ends of the cylinders 120 for operation of the pistons in these cylinders. These valves permit the air to exhaust from each end of the cylinder while supplying compressed air to the other end. Suitable cut-off valves 150 may be provided for shutting off the air pressure from the supply to the various cylinders. Suitable counterweights 151 and 152 may be provided and secured to the plates of the turret when found desirable to balance the turret.

The operation is as follows:

A lower screen 26 on which are a number of articles 28, such, for example, as slides for ladies' hose supporters, which have been enamelled by spraying a coating of liquid enamel thereon and baking, in which operation the over-spray has caused these articles to adhere or stick to the screen, is placed on the guides 29, and a similar screen 26a placed over this screen and the articles thereon. The turret 2 is turned to the position of Figs. 2, 4 and 5, with the brush 33 above clamping plates 34 and the guide channels 25 in alignment with these guides 29, the turret being held in this position by the pawls 125. The two superimposed screens are then slid along the guides 29 into the guide channels 25 to the position indicated by Fig. 4, between the brush 33 and the plates 34. This is also the position of the elements shown in Fig. 14. The inward movement of the screens is arrested and limited by the yieldable spring pressed stops 153 mounted on the rear member 3 of the frame at the rear of the turret.

The operator now operates the valve 92 by means of one of the hand levers 93 to supply compressed air to the left hand end of the cylinder 76. This shifts the connecting rod 80 to the right, as shown in Fig. 2, and through the lever 82, spider 88, levers 55 and 74, and connecting rods 54 and 72, will operate the toggles 49, 51 and 67, 69, and the various levers operated thereby will clamp the brush 33 and the four clamping plates 34 on opposite sides of the screens 26 and 26a. This is the position indicated by the detailed section of Fig. 15. In this position bristles of the brush pass through the upper screen and engage the articles 28 on the surface of the lower screen, and should any of them be loose, will hold them against shifting on the screen during the turning operation. This turning operation is accomplished by turning the turret 2 through 180° to the position of Fig. 9, to thus turn the screens 26 and 26a over and bring the brush to the under side of these screens and the clamped plates 34 to the upper side. This is also the position indicated by Fig. 16.

The operator now, by manipulating the valve 138, supplies compressed air to the upper ends of the cylinders 105. This shifts the pistons in these cylinder together with the connecting rod 104 connected thereto, downwardly, pressing the lower ends 103 of these rods against the discs 102 at the top of the springs 101 in the plungers or hammers 99, and as these plungers are supported by the trigger plates 114 they will be held against downward movement, so that these springs 101 are each compressed and loaded by pressure of the rods 104. Downward movement of these rods relative to the plungers 99 is permitted by the elongated slots 109 in the opposite sides of the plungers, which permit the transverse pins 110 in the rods 104 to move downwardly with these rods. After the springs are thus compressed or loaded the operator manipulates the valve 139 to admit air to the left hand end of the cylinders 20 as viewed in Fig. 22. These cylinders therefore shift the respective trigger plates 114 to the right as viewed in Fig. 22 to release the plungers or hammers 99 to permit them to be shifted downwardly through the openings 116 by the compressed or loaded springs, thus imparting a sharp blow to each of the clamping plates 34 which are located one below each of the plungers 99. This sharp blow imparted to each clamping plate is transmitted by these plates to the screens clamped between the brush and these plates, which blow will loosen the slides 28 or other articles which may be stuck to the screen by the enamel. The hammers or plungers 99 may now be retracted or raised to their upper positions by exhausting air from the top of the cylinders 105 and supplying air to the lower ends thereof. This will raise the connecting rods 104, causing the transverse pin 110 to engage the upper ends of the slots 109 and raise the hammers or plungers 99 to their upper or retracted position. The operator may now manipulate the valve 139 to exhaust the air from the left hand ends of cylinders 120 and supply air to the right hand ends thereof, which will shift the trigger plates 114 from their released positions to the holding positions under the plungers 99, as shown in Fig. 22.

The operator may now manipulate the valve 92 to exhaust air from the left hand end of the cylinder 76 and admit air to the right hand end, to thus release the toggles 49, 51 and 67, 69 to shift the brush 33 and clamping plates 34 away from the superimposed screens and thus release the clamping action thereon. This is the position indicated in Fig. 17. These screens with the loosened articles 38 may now be withdrawn from the machine. In this position the screens are reversed with the loosened articles now supported on what was the upper screen 26a, and if only one side had been enamelled the opposite or unenamelled side of the loosened articles are now facing upward and may be sprayed with enamel and baked, completing the enamelling of the articles. After this operation the screens carrying the articles may again be returned to the machine and the article loosened from the supporting screen, as indicated above. After removing the screens with the loosened articles the turret may again be turned to the loading position to receive the next pair of screens with the attached articles between them for the next releasing operation.

It will be seen from the above that this is a very simple operation, the superimposed screens with the articles attached to one of them being simply inserted in the machine, then clamped between the brush and the plates 34, then turned over by turning the turret through 180 degrees, the releasing blow imparted by the spring-loaded plungers, and the screens released from the clamping action of the brush and the plates 34 permitting them to be withdrawn from the machine, with each of the articles 28 loosened from the screen. After the screens are removed from the machine the turret may be turned to the position for the next similar operation. This will also be seen to permit rapid handling of the screens, and completion of the article-loosening operation without any manual blows required of the operator.

Having thus set forth the nature of my invention, I claim:

1. In a machine for loosening enamelled articles on screens, a rotatable support comprising upright longitudinally spaced end members and longitudinally extending supporting members extending between and carried by the end members, transverse guides at the inner sides of the end members adapted to receive the opposite edges of superimposed screens with the enamelled articles between them, clamping means for said screens mounted on the support comprising a bristle brush on one side of the plane of said guides and clamping plates at the opposite side of said plane, means mounted on the support for clamping the brush and plates against opposite sides of the screens in the guides, and means mounted on the supporting members for imparting a blow to said first mentioned clamping means after clamping of the screens to loosen the articles between the screens.

2. In a machine for loosening enamelled articles on screens, a rotatable support comprising upright longitudinally spaced end members and longitudinally extending supporting members extending between and carried by the end members, a bristle brush and opposed clamping plates adapted to receive and provide clamping means for superimposed screens between them carried by said support between the end members, means mounted in the support for clamping the brush and plates on opposite sides of the screens, and means mounted on the supporting members for imparting a blow to said first mentioned clamping means after clamping of the screens to loosen enamelled articles between the screens.

3. In a machine for loosening enamelled articles on screens, a rotatable support, means mounting the support for rotation about a horizontal axis, a bristle brush and clamping plates opposed to the brush mounted in the support and positioned for insertion of superimposed screens carrying articles to be loosened between them, means mounted in the support for claming the brush and plates on opposite sides of the screens, and means mounted in the support for imparting a blow to the clamped plates for loosening articles stuck to the screens.

4. The machine according to claim 3 in which the blow imparting means comprises at least one air cylinder provided with a piston, a plunger forming a hammer adjacent a clamping plate, a spring between the hammer and piston, a trigger means normally retaining the plunger in retracted position, control means for supplying compressed air to the cylinder to operate the piston to pre-load the spring, and control means for releasing the trigger to permit the loaded spring to operate the plunger to impart a blow to the plate.

5. In a machine for loosening enamelled articles on screens, a rotatable support, means mounting the support for rotation about a horizontal axis, a bristle brush and clamping plates opposed to the brush mounted in the support and positioned for insertion of superimposed screens between them, an air cylinder including a piston, means mounted in the support for clamping the brush and plates on opposite sides of superimposed screens inserted between them, operating means connecting said piston with the clamping means for operation thereby, means mounted in the support for imparting a blow to each plate in the clamped position to loosen articles adhering to a screen, and control means for the clamping means and blow-imparting means.

6. In a machine for loosening enamelled articles on screens, a rotatable support comprising a series of longitudinally extending supporting plates and longitudinally spaced end members supporting the plates, clamping means for superimposed screens mounted in the support comprising a bristle brush and opposed clamping plates, means mounted in the support for clamping the brush and plates on opposite sides of screens inserted between them comprising a series of pivoted arms mounted in the support and connected to the brush and plates, toggle means connected to the arms for operating them, an air cylinder including a piston, operative connections from the piston to the toggle means, and means mounted in the support for imparting a blow to the clamping plates in the clamped position to jar the screens and loosen article adhering to a screen.

7. A machine according to claim 6 in which the blow-imparting means to the clamped plates comprises a spring-operated hammer for each plate, trigger means normally retaining the hammers in retracted position, means for preloading the springs while the hammers are in the retracted position, and means for then releasing the trigger means to release the hammers for operation by the preloaded springs.

8. In a machine for loosening enamelled articles on screens, a rotatable support comprising a series of longitudinally extending supporting members and longitudinally spaced end members carrying the supporting members, means mounting the support for rotation about a horizontal axis, clamping means mounted in the support for superimposed screens comprising a bristle brush and opposed clamping plates, means mounted in the support for clamping the brush and plates on the upper and lower sides respectively of superimposed screens inserted between the brush and plates, means for then rotating the support to locate the brush and clamping plates respectively on the lower and upper sides of the screens, and means mounted in the support for then imparting a sharp blow to the upper sides of the plates to jar the screens and loosen articles adhering thereto.

9. In a machine for loosening enamelled articles on screens, a rotatable support, means mounting the support to rotate about a horizontal axis, means mounted in the support for clamping superimposed screens comprising a brush and opposed clamping plate means, releasable means for positioning the support with the brush above the plate means for insertion of the screens therebetween, means mounted in the support for clamping the brush and plate means on opposite sides of the inserted screens, means for then rotating the support to reverse the position of the screens with the brush and clamping plate means respectively on the lower and upper sides of the clamped screens, and means mounted in the support for then imparting a sharp blow to the clamping plate means to jar the screens and loosen articles adhering thereto.

10. A machine according to claim 9 in which the blow-imparting means includes a spring-operated hammer, releasable trigger means normally retaining the hammer in retracted position, power means for preloading the spring while the hammer is in the retracted position, and means for then releasing the trigger means to release the hammer for operation by the preloaded spring to impart a blow to the clamped plate means.

No references cited

UNITED STATES PATENT OFFICE

CERTIFICATE OF CORRECTION

Patent No. 2,891,503 June 23, 1959

Clifton H. Ineson

It is hereby certified that error appears in the above numbered patent requiring correction and that the said Letters Patent should read as corrected below.

In the grant, lines 2 and 3, address of assignee, for "New Haven, Connecticut" read -- Waterbury, Connecticut --; in the heading to the printed specification, line 5, for "New Haven, Conn." read -- Waterbury, Conn. --.

Signed and sealed this 10th day of November 1959.

(SEAL)

Attest:

KARL H. AXLINE
Attesting Officer

ROBERT C. WATSON
Commissioner of Patents